United States Patent
Kwak et al.

(10) Patent No.: US 8,938,276 B2
(45) Date of Patent: Jan. 20, 2015

(54) SIDE SLIDING TYPE MOBILE TERMINAL

(75) Inventors: Woo-Young Kwak, Gyeonggi-Do (KR); Sang-Wook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 697 days.

(21) Appl. No.: 12/560,343

(22) Filed: Sep. 15, 2009

(65) Prior Publication Data

US 2010/0004038 A1    Jan. 7, 2010

Related U.S. Application Data

(63) Continuation of application No. 11/228,740, filed on Sep. 15, 2005, now Pat. No. 7,610,069.

(30) Foreign Application Priority Data

Dec. 22, 2004 (KR) .......................... 10-2004-110676

(51) Int. Cl.
  *H04M 1/00* (2006.01)
  *H04M 1/02* (2006.01)
  *G06F 1/16* (2006.01)
  *H04M 1/23* (2006.01)

(52) U.S. Cl.
  CPC .......... *H04M 1/0237* (2013.01); *G06F 1/1624* (2013.01); *G06F 1/1671* (2013.01); *G06F 1/1677* (2013.01); *H04M 1/0245* (2013.01); *H04M 1/23* (2013.01); *G06F 2200/1614* (2013.01)
  USPC ..................... 455/575.4; 455/575.1; 455/566; 361/727

(58) Field of Classification Search
  USPC ............. 455/575.4, 575.1; 360/680–681, 727
  See application file for complete search history.

(56) References Cited

U.S. PATENT DOCUMENTS 6,243,595 B1   6/2001 Lee et al.
6,483,445 B1 * 11/2002 England .......................... 341/22
(Continued)

FOREIGN PATENT DOCUMENTS

CN   1441611   9/2003
DE   203 17 865 U1   4/2004
(Continued)

OTHER PUBLICATIONS

"Nokia Communicator," Wikipedia—the free encyclopedia, Jun. 2011.

*Primary Examiner* — Nay A Maung
*Assistant Examiner* — Erica Fleming-Hall
(74) *Attorney, Agent, or Firm* — Lee, Hong, Degerman, Kang & Waimey (57) ABSTRACT

A mobile terminal comprises a body comprising a keypad and a slider slidingly coupled to the body. The slider is configured to slide transversely with respect to the body and may comprise a display unit to display image information. The mobile terminal may further comprise a processor coupled to the slider to detect when the slider is slid from a first position to a second position and when the slider is slid from a second position to a first position. The image information may be rotated 90 degrees from a transverse orientation to a longitudinal orientation when the processor detects that the slider has been slid from the first position to the second position. Conversely, the image information may be rotated 90 degrees from a longitudinal orientation to a transverse orientation when the processor detects that the slider has been slid from the second position to the first position.

33 Claims, 10 Drawing Sheets

(56) References Cited

U.S. PATENT DOCUMENTS

| | | | |
|---|---|---|---|
| 6,636,419 B2 * | 10/2003 | Duarte | 361/679.09 |
| 7,107,018 B2 * | 9/2006 | Jellicoe | 455/90.3 |
| 7,262,761 B1 * | 8/2007 | Duarte et al. | 345/168 |
| 7,353,053 B2 * | 4/2008 | Prichard et al. | 455/575.4 |
| 7,610,069 B2 | 10/2009 | Kwak | |
| 2001/0048589 A1 | 12/2001 | Brandenberg et al. | |
| 2003/0090468 A1 * | 5/2003 | Finke-Anlauff | 345/169 |
| 2004/0014488 A1 * | 1/2004 | Sawayama et al. | 455/550.1 |
| 2005/0052837 A1 * | 3/2005 | Kota et al. | 361/683 |
| 2005/0054398 A1 * | 3/2005 | Kim | 455/575.4 |
| 2005/0059438 A1 * | 3/2005 | Jellicoe | 455/575.1 |
| 2005/0064921 A1 * | 3/2005 | Jeong et al. | 455/575.4 |
| 2005/0070348 A1 * | 3/2005 | Lee et al. | 455/575.4 |
| 2005/0107137 A1 * | 5/2005 | Byun et al. | 455/575.1 |
| 2005/0113154 A1 * | 5/2005 | Park et al. | 455/575.4 |
| 2005/0124394 A1 * | 6/2005 | Kim et al. | 455/575.3 |
| 2005/0124398 A1 * | 6/2005 | Lee et al. | 455/575.4 |
| 2005/0215298 A1 * | 9/2005 | Lee | 455/575.4 |
| 2006/0109980 A1 * | 5/2006 | Miyazaki | 379/433.12 |
| 2007/0293283 A1 * | 12/2007 | Inubushi et al. | 455/575.1 |
| 2008/0139260 A1 * | 6/2008 | Kauhaniemi et al. | 455/575.4 |

FOREIGN PATENT DOCUMENTS

| | | | |
|---|---|---|---|
| EP | 1 220 517 A1 | 7/2002 | |
| EP | 1220517 | 7/2002 | |
| EP | 1 312 999 A2 | 5/2003 | |
| EP | 1312999 | 5/2003 | |
| JP | 2002057763 | 2/2002 | |
| JP | 2003125053 | 4/2003 | |
| JP | 2003288154 | 10/2003 | |
| JP | 2003319042 A * | 11/2003 | H04M 1/02 |
| KR | 1020030000166 | 1/2003 | |
| KR | 1020030000166 A | 1/2003 | |
| KR | 1020040102680 | 12/2004 | |
| KR | 1020040102680 A | 12/2004 | |
| WO | 0038332 | 6/2000 | |
| WO | WO 00/38332 A | 6/2000 | |
| WO | 04/001980 | 12/2003 | |
| WO | 2004049150 | 6/2004 | |
| WO | WO 2004/049150 A3 | 6/2004 | |

* cited by examiner

SIDE SLIDING TYPE MOBILE TERMINAL

CROSS-REFERENCE TO RELATED APPLICATIONS

This application is a continuation of U.S. application Ser. No. 11/228,740, filed Sep. 15, 2005, now U.S. Pat. No. 7,610,069, which pursuant to 35 U.S.C. §119(a), claims the benefit of earlier filing date and right of priority to Korean Application No. 10-2004-0110676, filed on Dec. 22, 2004, the contents of which are hereby incorporated by reference herein in their entirety.

FIELD OF THE INVENTION

The present invention relates generally to a mobile terminal, and more particularly to a sliding type mobile terminal.

BACKGROUND OF THE INVENTION

A mobile terminal is a communication device which permits mobile communication with another party. Mobile terminals are capable of voice communication, sending and receiving text messages, accessing the Internet, receiving television signals, and capturing still and video images and sending the captured images to the other party. Mobile terminals may have various types of construction, such as a top sliding type, a folder type, a flip type, and a bar type.

Figure 1:
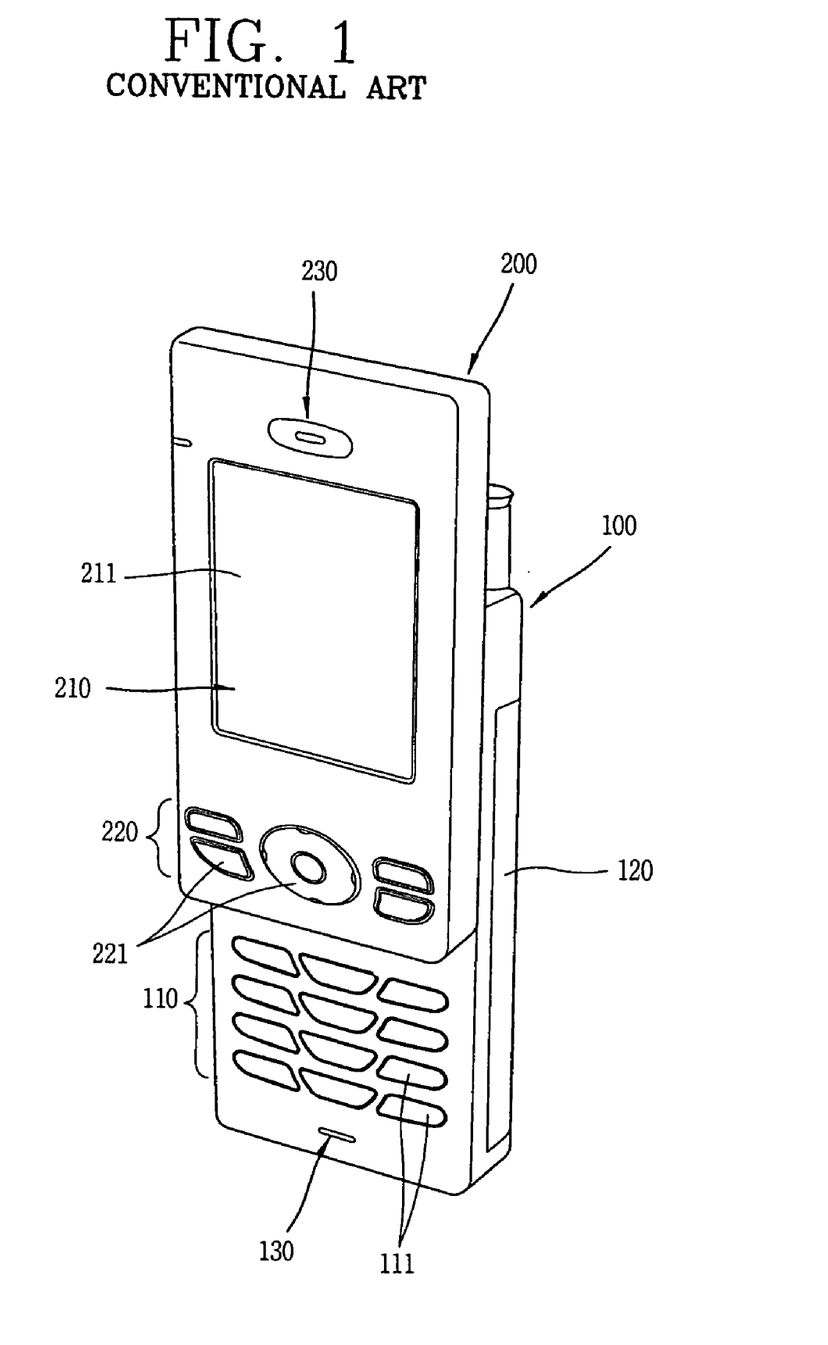
FIG. 1 is a perspective view illustrating a top sliding type mobile terminal.
Figure 2:
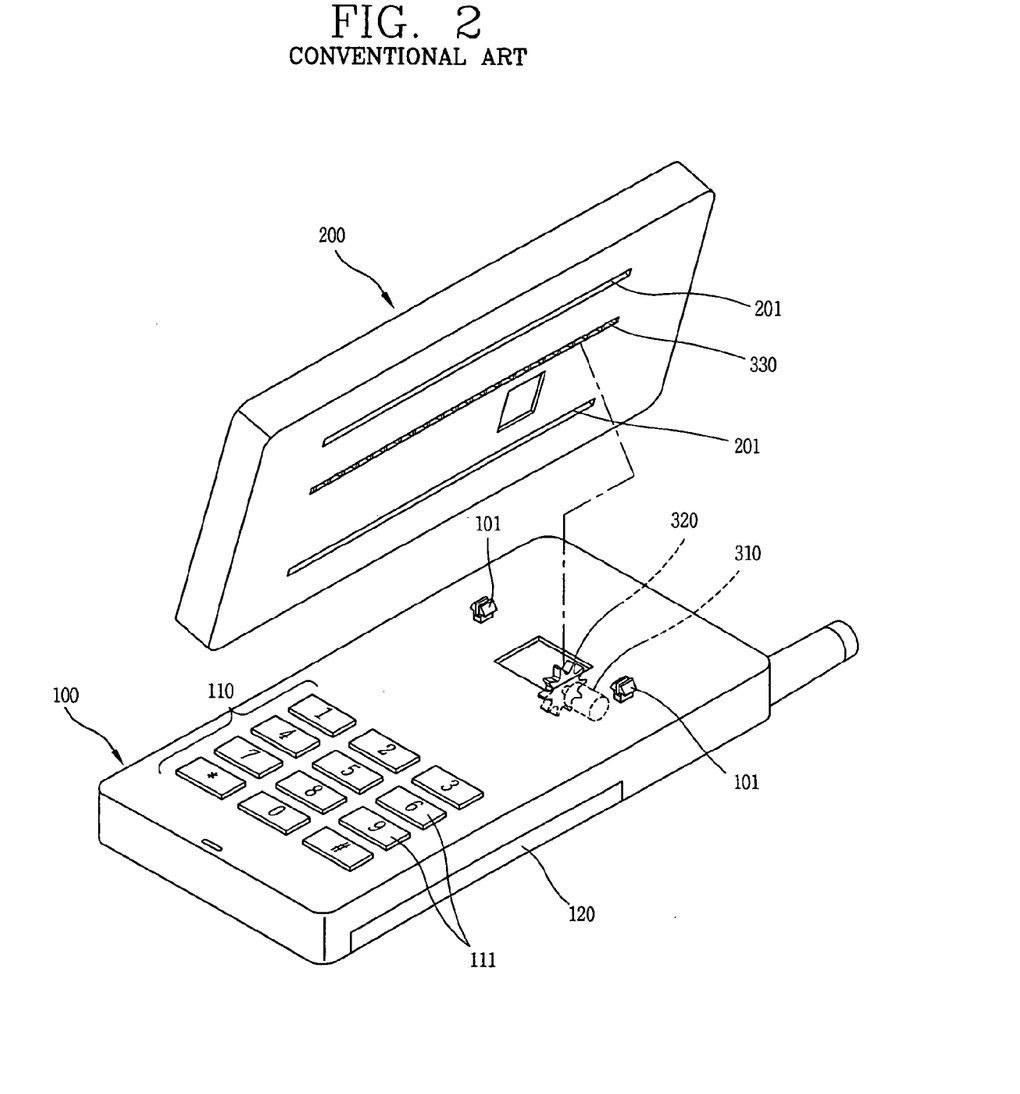
FIG. 2 is an exploded view illustrating the top sliding type mobile terminal.
Figure 3:
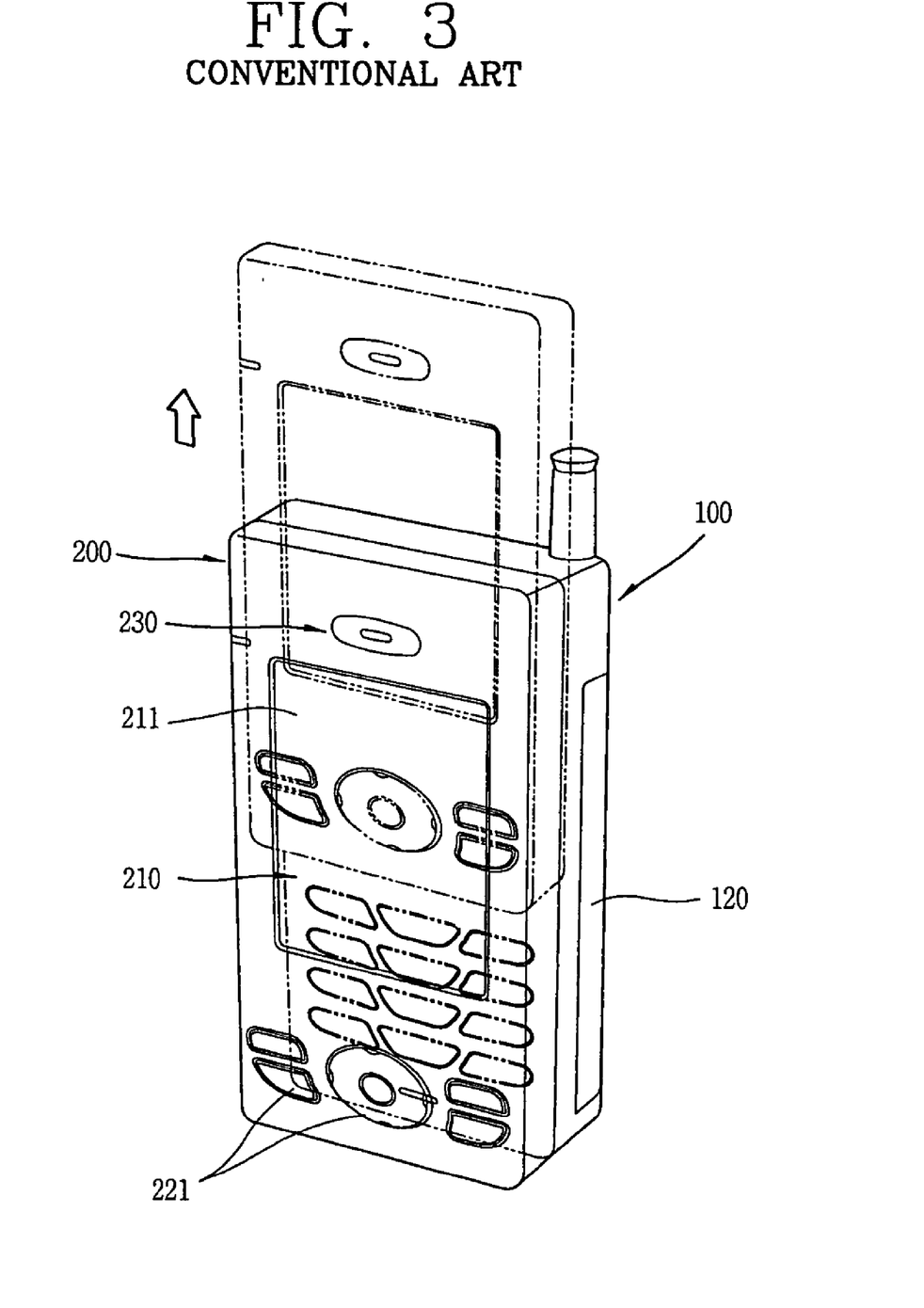
FIG. 3 is a perspective view illustrating operation of the top sliding type mobile terminal.

FIG. 1 is a perspective view illustrating a top sliding type mobile terminal. FIG. 2 is an exploded view illustrating the top sliding type mobile terminal. FIG. 3 is a perspective view illustrating operation of the top sliding type mobile terminal.

Referring to FIG. 1, the mobile terminal includes a body 100 having a lower portion that includes a keypad 110. The mobile terminal also includes a slider 200 configured to slidingly couple to the body 100. The mobile terminal also includes a longitudinal sliding unit coupled between the slider 200 and the body 100 such that the slider 200 may move longitudinally with respect to the body 100. The mobile terminal also includes a display unit 210 fixedly coupled to the slider 200.

The body 100 may be constructed in a rectangle shape and have a certain thickness. A keypad 110 has a plurality of keys 111 and is placed in the body 100 such that the keys 111 may protrude outside of the body 100. However, the number of the keys 111 may be decreased because of limitations on the size of the area where the keys 111 are arranged. Therefore, each of the keys 111 may have both a function of entering numbers and a function of entering letters. That is, the primary function of the keys 111 is to enter numbers, but each of the keys 111 may also be used to enter a plurality of letters. Therefore, to input a message, the same key 111 may need to be pressed several times to input different letters.

When in a first position, the slider 200 is placed on top of the body 100 such that the keys 111 are covered by the slider 200. When the slider 200 is moved in a longitudinal direction with respect to the body 100, the keys 111 are exposed to provide access to the keys 111 for a user. Furthermore, a battery 120 is detachably mounted on the lower surface of the body 100.

A display unit 210 is provided on an outer surface of the slider 200. An operating keypad 220 is provided on the outer surface of the slider 200, below the display unit 210. Voice phone calls are made and terminated by pressing keys 221 on the operating keypad 220. A display window 211 of the display unit 210 is rectangular in shape and is oriented in the same longitudinal direction as the slider 200.

Referring to FIG. 2, the longitudinal sliding unit is provided on an inner surface of the body 100 and an inner surface of the slider 200. The longitudinal sliding unit includes a driving motor 310 provided in the body 100, a pinion 320 coupled to the driving motor 310, and a rack 330 mounted longitudinally on the inner surface of the slider 200 and having one side engaged with the pinion 320. Reference numerals 201, 101, 230 and 130 represent guide grooves, guide protrusions inserted into the guide grooves, a receiver and a microphone, respectively. A semi-automatic closing technique may be implemented in the mobile terminal using a wire spring.

Referring to FIG. 3, operation of the mobile terminal is described. When a user talks to another party using the mobile terminal, the user first moves the slider 200 longitudinally to expose the keypad 110. The user then inputs the other party's telephone number by pressing the keys 111 and executes the call using the keys 221 on the operating keypad 220. After completing the call, the user moves the slider 200 longitudinally to cover the keypad 110. Furthermore, to answer a call, the user moves the slider 200 longitudinally to expose the keypad 110 and moves the slider 200 longitudinally to cover the keypad 110 when the call is completed.

Text messaging operates in a manner similar to voice calls. The user moves the slider 200 to expose the keypad 110 and types letters, numbers and/or symbols by pressing the number keys 111. Since the keys 111 on the number keypad 110 are primarily constructed for numerical input, each number may be entered with a single keystroke. However, to input letters or symbols requires the same key to be pressed two or three times.

Using the sliding type mobile terminal, the amount of space required for the slider 200 to move is minimal, allowing for the mobile terminal to have increased structural strength. On the other hand, in a folder type mobile terminal, the amount of space required for the folder to move is increased because the folder needs to be opened and closed on an axis located at one end of the body. Furthermore, the structural strength of the folding mobile terminal is weakened when the folder is opened.

However, in the top sliding type mobile terminal, the area on the body 100 that may be used for the keypad 110 is limited. Therefore, a small number of keys 111 are included in the keypad 110, necessitating that multiple functions must be assigned to each key 111. Furthermore, if letters are inputted using the keys 111, each key 111 must be pressed two or three times for each letter to be input. The above drawbacks may make the top sliding type mobile terminal inconvenient for sending and receiving text messages.

SUMMARY OF THE INVENTION

Accordingly, the present invention is directed to a side sliding type mobile terminal that substantially obviates one or more problems due to limitations and disadvantages of the related art.

An object of the present invention is to provide a side sliding type mobile terminal and a controlling method thereof capable of including an expanded keypad to simplify letter input by utilizing a wider area to increase the number of letter keys available to a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a mobile terminal comprises a body comprising a keypad and a slider slidingly coupled to the body. The slider is configured to slide transversely with respect to the body and may comprise a display unit configured to display image information.

The keypad may comprise keys arranged longitudinally with respect to the body. The slider may be configured to slide into a first position and a second position. The keypad may be covered by the slider when the slider is slid into the first position and the keypad may be exposed when the slider is slid into the second position.

The slider may comprise a display unit configured to display image information. The mobile terminal may further comprise a processor coupled to the slider, configured to detect when the slider is slid from the first position to the second position and when the slider is slid from the second position to the first position. The image information may be rotated 90 degrees from a transverse orientation to a longitudinal orientation when the processor detects that the slider has been slid from the first position to the second position. Conversely, the image information may be rotated 90 degrees from a longitudinal orientation to a transverse orientation when the processor detects that the slider has been slid from the second position to the first position.

The slider may further comprise a number keypad for numerical input and an operational keypad for performance of call functions. The keypad may comprise letter keys and symbol keys, and may have a QWERTY key layout, for example.

In another embodiment, a mobile terminal comprises a body having a length (longitudinal dimension) different from a width (transverse dimension), the body comprising a keypad having keys. The mobile terminal also comprises a transverse sliding unit coupled to the body and a slider, configured to enable the slider to slide transversely with respect to the body. The mobile terminal also comprises the slider coupled to the transverse sliding unit.

In yet another embodiment, a method of controlling a mobile terminal comprises transversely sliding a slider with respect to a body and detecting the sliding of the slider with respect to the body. The method also comprises rotating image information on a display unit of the slider to enable viewing of the image information by a user in response to the detecting of the sliding of the slider with respect to the body.

The sliding of the slider may expose a keypad on the body to enable the user to perform text based communication. Conversely, the sliding of the slider may place the slider in a position on top of the body to enable the user to perform voice based communication.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 4:
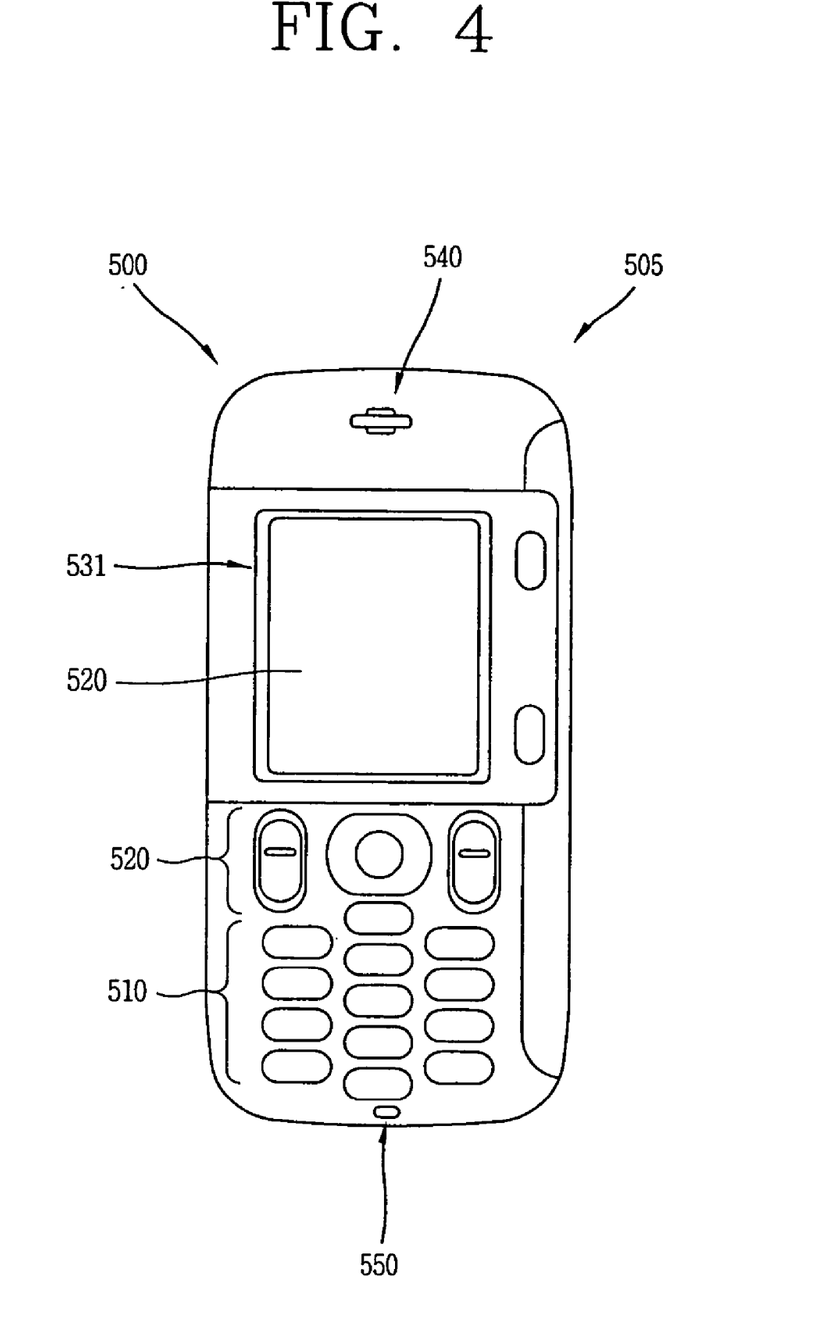
FIG. 4 is a front view illustrating a side sliding type mobile terminal, according to one embodiment of the present invention.
Figure 5:
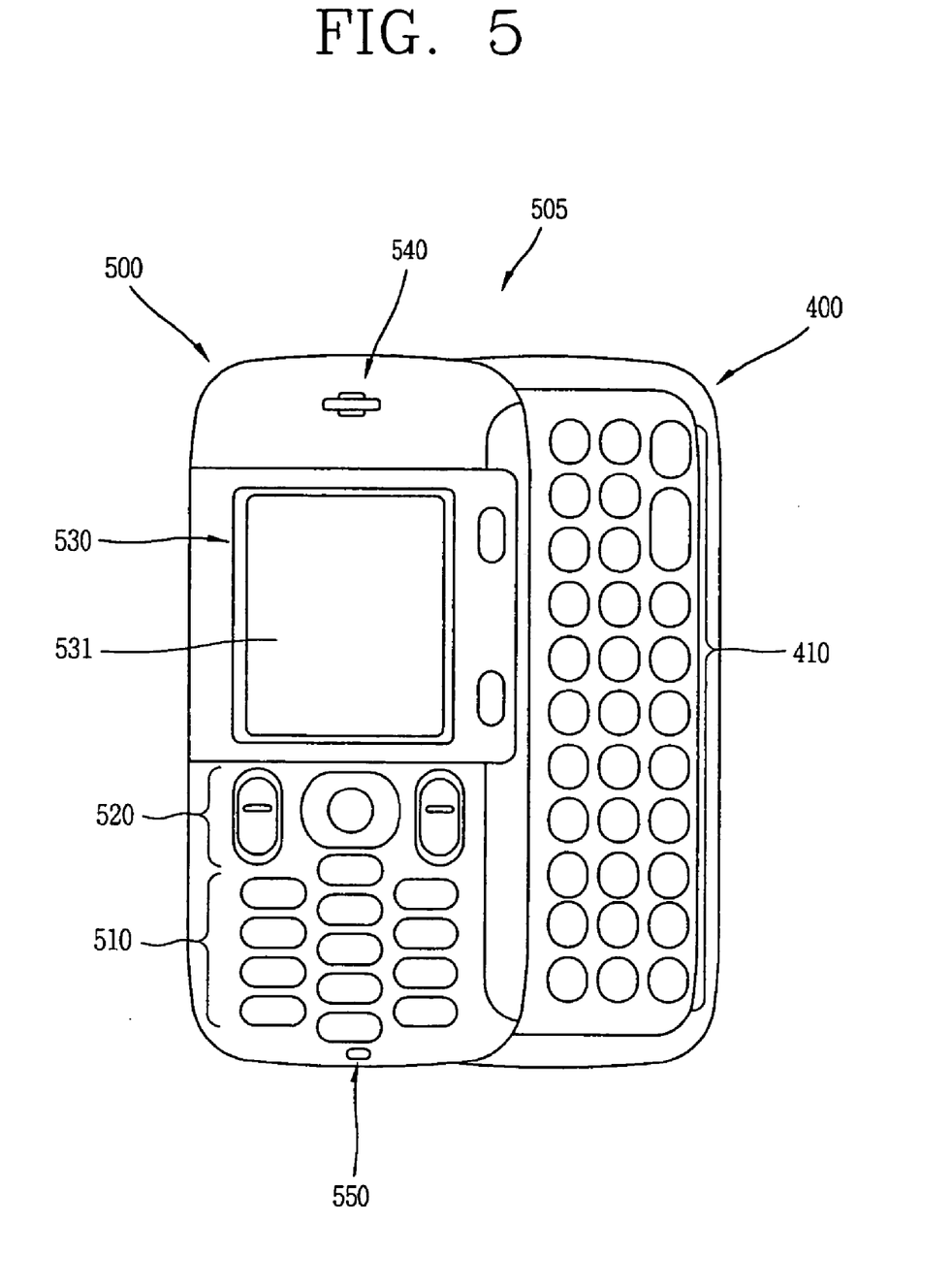
FIGS. 5 and 6 are a front view and a rear view, respectively, illustrating a side sliding type mobile terminal in an opened configuration, according to one embodiment of the present invention.
Figure 6:
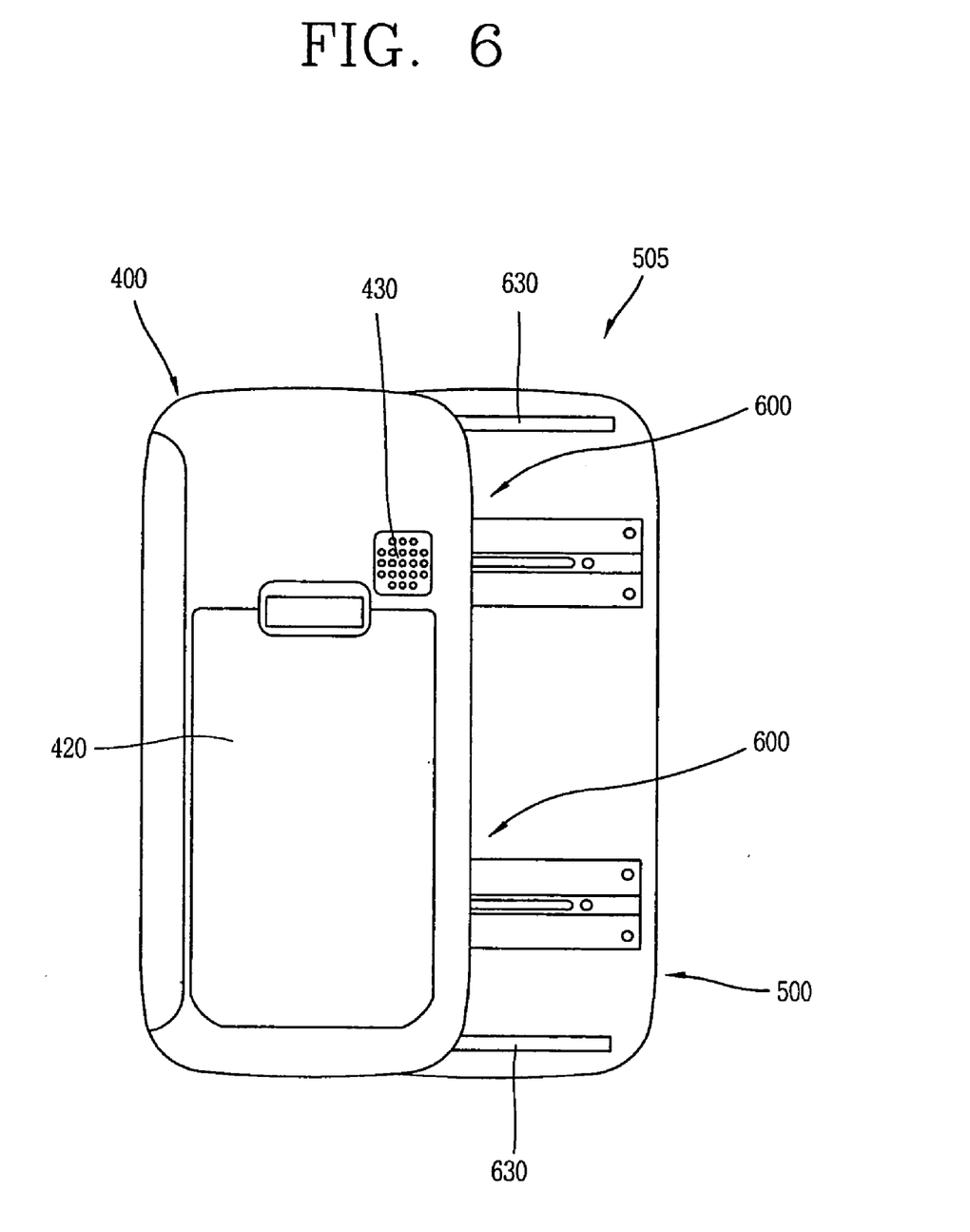

FIG. 4 is a front view illustrating a side sliding type mobile terminal, according to one embodiment of the present invention. FIGS. 5 and 6 are a front view and a rear view, respectively, illustrating a side sliding type mobile terminal in an opened configuration, according to one embodiment of the present invention.

Referring to FIGS. 4-6, a side sliding type mobile terminal (mobile terminal) 505 includes a body 400. The mobile terminal 505 also includes a slider 500 configured to slidingly couple to the body 400. The length and the width of the body 400 may be different from each other. Similarly, the length and the width of the slider 500 may be different from each other. The mobile terminal 505 also includes a transverse sliding unit 600 mounted between the body 400 and the slider 500 such that the slider 500 may move (e.g., slide) transversely with respect to the body 400.

The body 400 may be constructed with a rectangular shape and may have a predetermined thickness, for example. The width of the body 400 may be smaller than the length of the body 400. Inner surfaces of the body 400 and the slider 500, respectively, are the surfaces that are mounted to the transverse sliding unit 600. Outer surfaces of the body 400 and the slider 500, respectively, are the surfaces opposite the inner surfaces of the body 400 and the slider 500. The inner surface of the body 400 may be divided into two sections, a first section being a key arrangement region, where a keypad 410 is located, and a second section being a mounting region for coupling with the transverse sliding unit 600. The keypad may preferably include a QWERTY keypad layout.

The slider 500 may also be constructed with a rectangular shape and may have a predetermined thickness, for example. The inner surfaces of the body 400 and the slider 500 may have the same size and shape. A printed circuit board (PCB) or the like may be mounted within the slider 500.

A number keypad 510 may be provided on the outer surface of the slider 500. Operating keys 520 may also be provided on the outer surface of the slider 500, such as for example, above the number keypad 510. A display unit 530 may be provided on the outer surface of the slider 500, such as for example, above the operating keys 520. A display window 531 may be formed in the display unit 530. The display window 531 may have a rectangular shape, with a width different from a length, for example.

Figure 7:
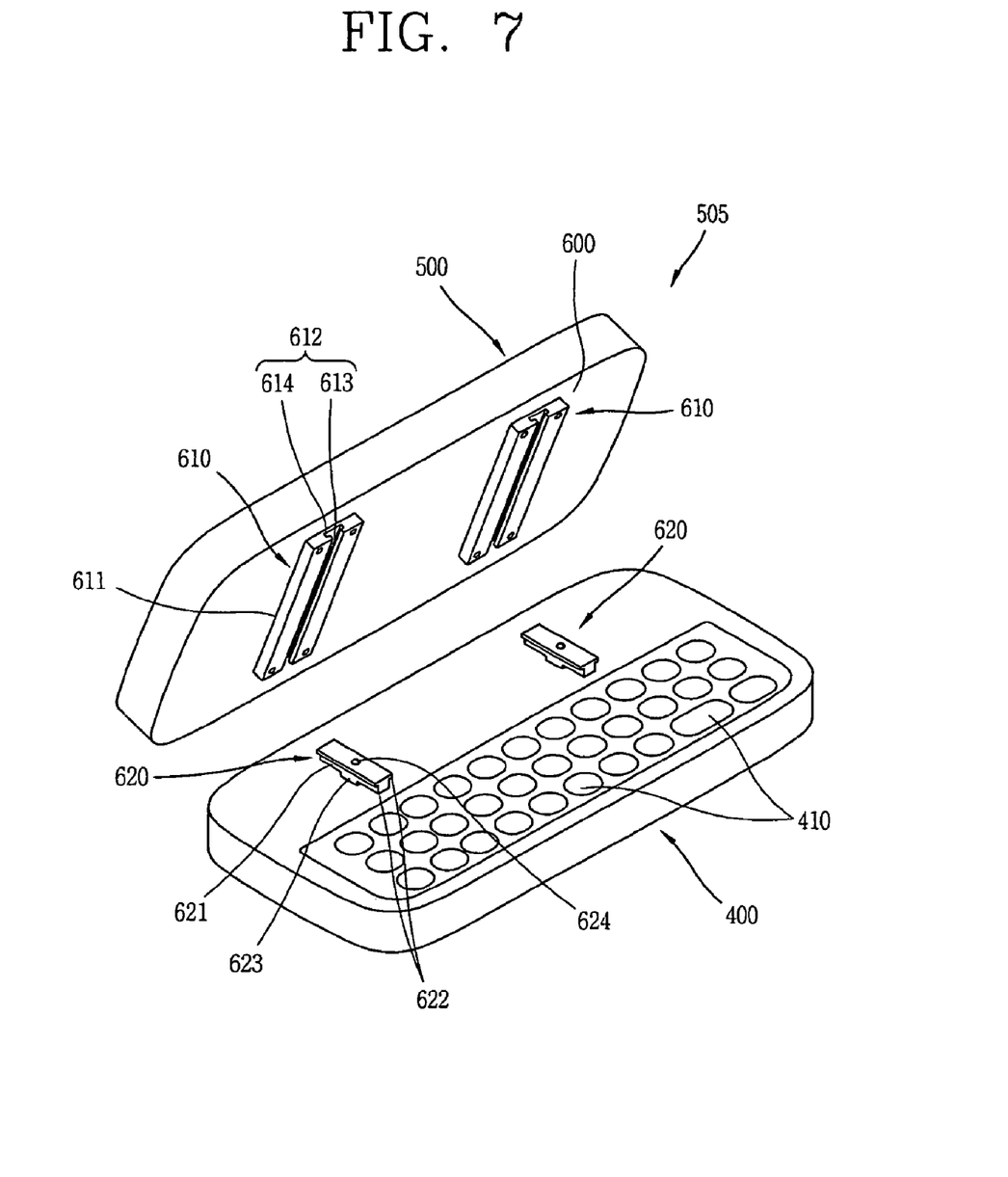
FIGS. 7 and 8 are an exploded perspective view and a cross-section view, respectively, illustrating a transverse sliding unit used in a side sliding type mobile terminal, according to one embodiment of the present invention.
Figure 8:
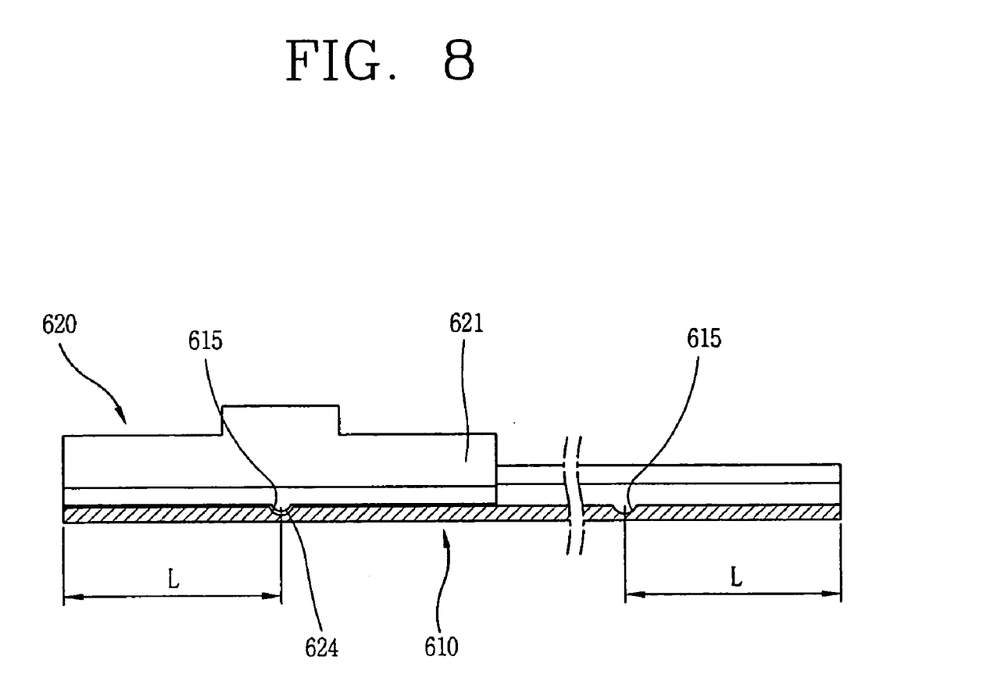

FIGS. 7 and 8 are an exploded perspective view and a cross-section view, respectively, illustrating a transverse sliding unit used in a side sliding type mobile terminal, according to one embodiment of the present invention.

Referring to FIG. 7, the transverse sliding unit 600 includes a rail body 610 coupled to the slider 500. The transverse sliding unit 600 also includes a rail guide 620 slidably coupled to the rail body 610 and fixedly coupled to the body 400. The transverse sliding unit 600 may also include a detachment unit such that the rail guide 620 may be detached from the rail body 610 at a set position of the rail body 610.

The rail body 610 may include a base portion 611 coupled to the inside surface of the slider 500. The base portion 611 may be constructed with a rectangular shape and may have a predetermined thickness, for example. A rail groove 612 may be formed longitudinally in the base portion 611. The rail groove 612 may include a longitudinal groove portion 613 and transverse groove portions 614. The longitudinal groove portion 613 may have a specified width and depth and the transverse groove portions 614 may be constructed with a square shape at both sides of the surface of the longitudinal groove portion 613 closest to the slider.

The rail body 610 may be fixedly coupled to the inner surface of the slider 500 such that the longitudinal dimension of the rail body 610 coincides with the transverse dimension of the slider 500. The rail body 610 may be coupled to the slider 500 by a fastener, such as for example, a screw.

The rail guide 620 may include a rail portion 621 slidably coupled to the rail groove 612 and stopping portions 622 extending from both sides of the rail portion 621. The rail portion 621 may be constructed with a hexahedron shape and may have a width corresponding to the width of the rail groove 612, for example. A protrusion 623 may be formed at an upper surface of the hexahedron shaped rail portion 621. The stopping portions 622 may be constructed with a predetermined thickness and length at edges of the rail portion 621.

The rail guide 620 may be coupled to the mounting region on the inner surface of the body 400 such that the longitudinal dimension of the rail guide 620 coincides with the transverse dimension of the body 400. The rail guide 620 may be coupled to the body 400 by a fastener, such as for example, a screw. The rail portion 621 and the stopping portions 622 may be inserted into the rail groove 612 to couple the rail guide 620 to the rail body 610.

Referring to FIG. 8, the detachment unit may include detachment grooves 615 formed in the rail groove 612. The detachment unit may also include an elastic detachment protrusion 624 formed on the rail portion 621 of the rail guide 620 and configured to be detached from the detachment grooves 615 by the elasticity of the elastic detachment protrusion 624. Two detachment grooves 615 may be formed at certain intervals of the rail groove 612. The elastic detachment groove 624 may preferably be protrudingly formed at or near the center of the surface of the rail portion 621 away from the body 400. A first detachment groove 615 may be located at half a length of the rail guide 620 from an end of the rail body 610, for example. A second detachment groove 615 may be located at half a length of the rail body 610 from an end of the rail guide 620, for example. Furthermore, two transverse sliding units 600 may be disposed at certain intervals of the slider 500.

A buffering member 630 configured to smooth the sliding of the slider 500 with respect to the body 400 may be provided between the slider 500 and the body 400. The buffering member 630 may be constructed from lubrication-coated synthetic rubber wires, for example. Two buffering members 630 may be disposed at certain intervals of the slider 500, for example. A receiver 540 and a microphone 550 may be mounted on the outer surface of the slider 500. The receiver 540 may be mounted at an upper portion of the slider 500, for example, and the microphone 550 may be mounted on a lower portion of the slider 500, for example. A battery 420 and a speaker 430 may be detachably mounted to the outer surface of the body 400, for example.

Figure 9:
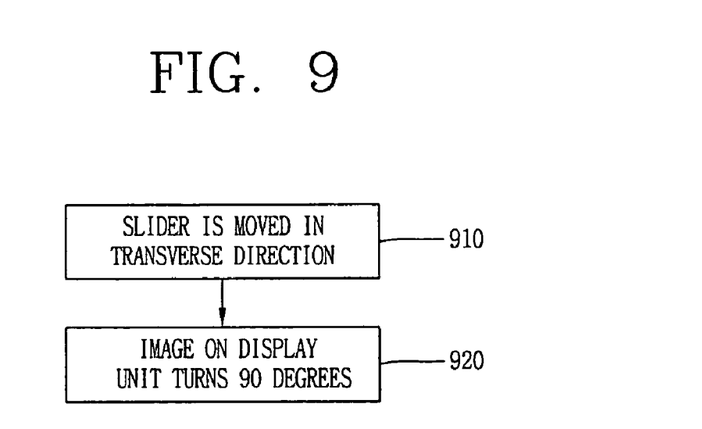
FIG. 9 is a flow diagram illustrating a method for controlling a side sliding type mobile terminal, according to one embodiment of the present invention.

FIG. 9 is a flow diagram illustrating a method for controlling a side sliding type mobile terminal, according to one embodiment of the present invention.

Referring to FIG. 9, the method of controlling the side sliding type mobile terminal comprises, at step 910, moving the slider 500, including the display unit 530, transversely with respect to the body 400. At step 920, image information is displayed on the display unit 530, the display unit 530 turning 90 degrees upon detecting the movement of the slider 500.

The body 400 and the slider 500 each have a length (longitudinal dimension) and a width (transverse dimension). The respective lengths of the body 400 and the slider 500 are longer than the respective widths of the body 400 and the slider 500. Longitudinal and transverse orientations are viewed with respect to lengths and widths of the body 400 and the slider 500. The slider 500 may preferably be slid transversely with respect to the body 400.

Figure 10:
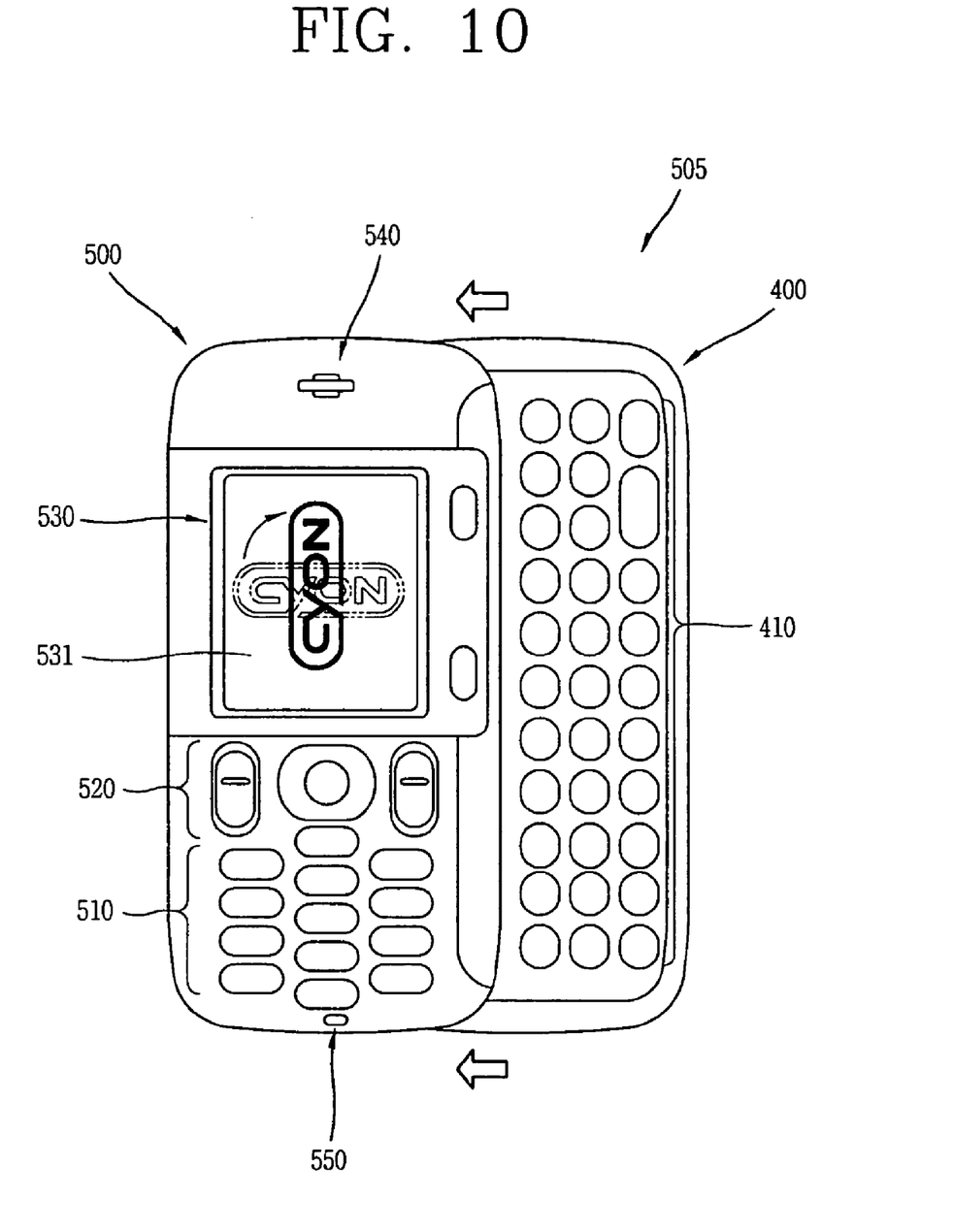
FIGS. 10 and 11 are front views illustrating a side sliding type mobile terminal, according to one embodiment of the present invention.
Figure 11:
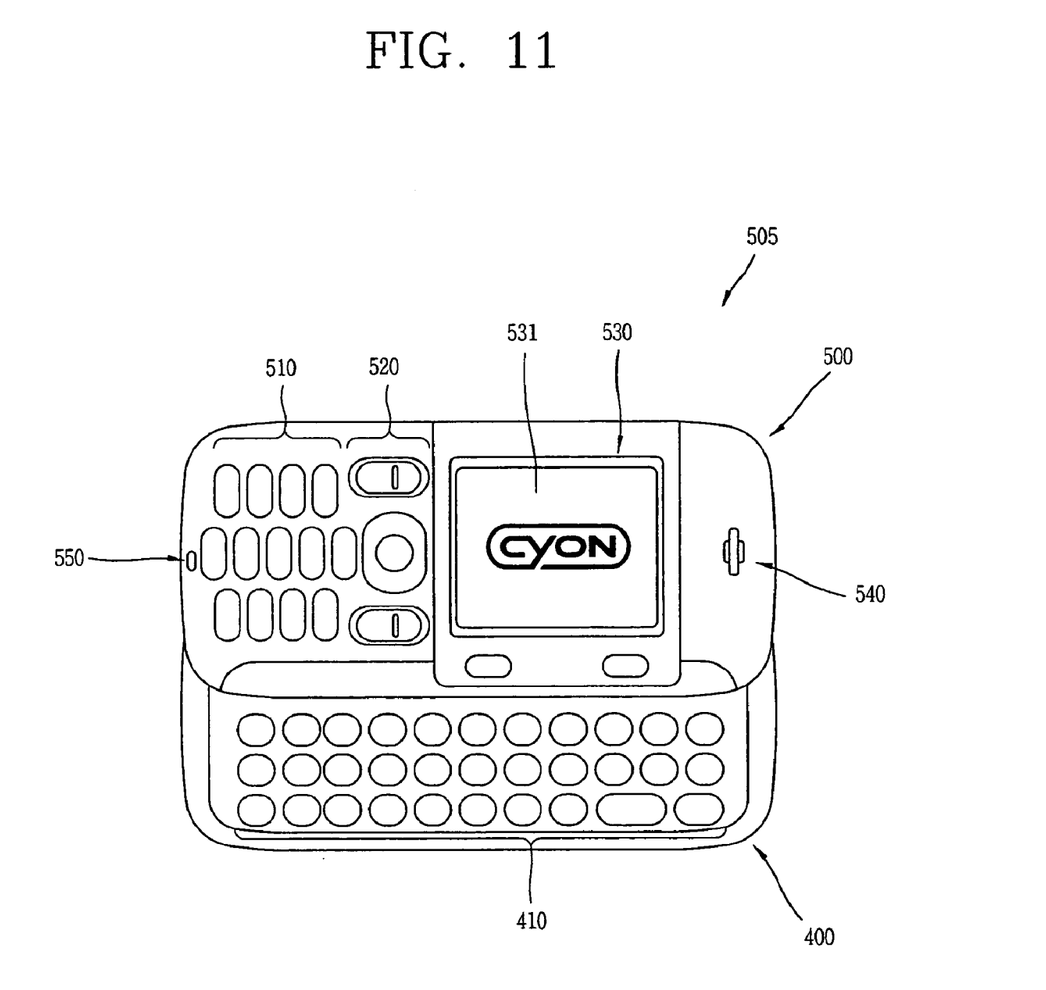

FIGS. 10 and 11 are front views illustrating a side sliding type mobile terminal, according to one embodiment of the present invention.

Referring to FIGS. 10 and 11, when the slider 500 is positioned on top of the body 400, image information may be displayed transversely with respect to the body 400. However, when the slider 500 is slid transversely with respect to the body 400 so that the slider 500 is no longer positioned on top the body 400, i.e. the slider 500 is extended from the body 400, the image information may be displayed longitudinally with respect to the body 400.

Operation of the side sliding type mobile terminal is described below. In a first example, the mobile terminal is used to make a voice call. The user inputs the telephone number of the receiving party by pressing the number keys 510 provided on the slider 500 and executes the call by pressing the operating keys 520. When finished with the call, the user may end the call by pressing the operating keys 520. Similarly, the user may answer an incoming call by pressing the operating keys 520. When finished with the call, the user may end the call by pressing the operating keys 520. In such voice call processes, image information may be displayed transversely on the display unit 530 to enable convenient viewing by the user. Furthermore, during such voice call processes, the slider 500 may be positioned on top of the body 400.

Referring again to FIG. 10, in a second example, the mobile terminal is used for text based communication, such as for example, text messaging or Internet usage. The user may slide the slider 500 in a transverse direction with respect to the body 400, so that the letter keys 410 provided on the body 400 are exposed. In the sliding of the slider 500 in the transverse direction, the rail body 610 coupled to the slider 500 and the rail guide 620 coupled to the body 400 may slide with respect to each other. If the slider 500 is slid a certain distance with respect to the body 400, the elastic protrusion 624 of the rail guide 620 coupled to the slider 500 may insert into and fix the detachment groove 615 of the rail body 610, so that the slider 500 becomes fixed in place. The transverse movement of the slider 500 may be detected by a processor within the mobile terminal. When the transverse movement of the slider 500 is detected, the image information displayed on the display unit 530 may be rotated 90 degrees, for example.

Referring to FIG. 11, the user may rotate the mobile terminal 90 degrees such that the mobile terminal 'faces' the user for convenient text input. That is, the mobile terminal may be oriented such that the letter keys 410 are positioned to face the user, the display unit 530 is positioned above the letter keys 410, and the image information is displayed longitudinally on the display unit 530. The user may then input letters and/or symbols using the letter keys 410 provided on the body 400.

When the user has finished using the letter keys 410, i.e. after sending a text messages or completing Internet usage, the user may slide the slider 500 transversely with respect to the body 400 so that the slider 500 retracts and fits on top of the body 400. As the user pushes the slider 500, the elastic protrusion 624 may separate from the detachment groove 615 and be inserted into a different detachment groove 615 to fix the slider 500 in position on top of the body 400. When the slider 500 is slid transversely to be positioned on top of the body 400, the image information displayed on the display unit 530 may rotate 90 degrees so that the image information is displayed transversely.

In one embodiment, a mobile terminal comprises a body comprising a keypad and a slider slidingly coupled to the body. The slider is configured to slide transversely with respect to the body and may comprise a display unit configured to display image information.

The keypad may comprise keys arranged longitudinally with respect to the body. The slider may be configured to slide into a first position and a second position. The keypad may be covered by the slider when the slider is slid into the first position and the keypad may be exposed when the slider is slid into the second position.

The slider may comprise a display unit configured to display image information. The mobile terminal may further comprise a processor coupled to the slider, configured to detect when the slider is slid from the first position to the second position and when the slider is slid from the second position to the first position. The image information may be rotated 90 degrees from a transverse orientation to a longitudinal orientation when the processor detects that the slider has been slid from the first position to the second position. Conversely, the image information may be rotated 90 degrees from a longitudinal orientation to a transverse orientation when the processor detects that the slider has been slid from the second position to the first position.

The slider may further comprise a number keypad for numerical input and an operational keypad for performance of call functions. The keypad may comprise letter keys and symbol keys, and may have a QWERTY key layout, for example.

In another embodiment, a mobile terminal comprises a body having a length (longitudinal dimension) different from a width (transverse dimension), the body comprising a keypad having keys. The mobile terminal also comprises a transverse sliding unit coupled to the body and a slider, configured to enable the slider to slide transversely with respect to the body. The mobile terminal also comprises the slider coupled to the transverse sliding unit.

The keypad may be positioned on top of the body when the slider is in the first position. The slider may have the same width and length as the body on the surfaces of the slider and the body that couple to the transverse sliding unit, respectively.

The transverse sliding unit may comprise a rail body coupled to the body or the slider, and a rail guide slidably coupled to the rail body and fixedly coupled to the body or the slider. The transverse sliding unit may further comprise a detachment unit configured to enable the rail guide to be detached from the rail body at a set position of the rail body. The detachment unit may comprise detachment grooves in the rail body, and an elastic detachment protrusion in the rail guide configured to couple with the detachment grooves. The rail body may comprise a base portion constructed with a rectangular shape and a predetermined thickness, and a rail groove formed longitudinally on a surface of the base portion. The rail guide may comprise a rail portion slidably coupled to the rail groove of the rail body, and stopping portions extending from both sides of the rail portion. The side sliding type mobile terminal may further comprise a buffering member coupled to the slider or the body, configured to buffer relative motion between the slider and the body.

In yet another embodiment, a method of controlling a mobile terminal comprises transversely sliding a slider with respect to a body and detecting the sliding of the slider with respect to the body. The method also comprises rotating image information on a display unit of the slider to enable viewing of the image information by a user in response to the detecting of the sliding of the slider with respect to the body.

The sliding of the slider may expose a keypad on the body to enable the user to perform text based communication. Conversely, the sliding of the slider may place the slider in a position on top of the body to enable the user to perform voice based communication.

By transversely sliding the slider 500 to be positioned on top of the body 400, the size of the mobile terminal may effectively decrease, allowing for greater portability. Furthermore, due to the side sliding type construction of the mobile terminal, the available area for arrangement of a letter keypad is increased. Additionally, since more area is available for a letter keypad, a key arrangement with a greater number of keys, such as for example, a QWERTY keypad may be included in the mobile terminal. Therefore, it may not be necessary to assign multiple functions to each key or to press a key several times to input a single letter. Furthermore, since the image information display may be rotated 90 degrees in response to sliding of the slider, the image information may be conveniently viewed by the user, regardless of whether the mobile terminal is being used for a voice call or text based communication. Thus, the present invention may enable convenient text based communication while still providing a bar type mobile terminal for voice calls.

It will be apparent to those skilled in the art that various modifications and variations may be made in the present invention without departing from the spirit or scope of the inventions. For example, although the present invention applies to mobile terminals, it may also apply to other types of portable electronic devices. Thus, it is intended that the present invention covers the modifications and variations of this invention provided they come within the scope of the appended claims and their equivalents.

What is claimed is:

1. A mobile terminal, comprising:
a body having a length that is longer than its width and having a first side which is divided into a mounting region and a key arrangement region for locating a keypad having keys;
a speaker mounted at the body;
a slider having a length that is longer than its width and having a display unit configured to display image information and at least one key for inputting a number or for operating the mobile terminal, wherein the display unit is mounted at a second side of the slider;
a receiver mounted at the second side of the slider;
a microphone mounted at the slider; and
a transverse sliding unit coupled to the body and the slider, the transverse sliding unit configured to enable the slider to slide transversely with respect to the body such that the slider is slidable in a widthwise direction,
wherein the transverse sliding unit comprises:
a rail body coupled to a third side of the slider and having a rail groove; and
a rail guide coupled to the mounting region and having a rail portion configured to slidably couple with the rail groove, wherein the rail portion is positioned away from at least a pair of edges of the body,
wherein the receiver is located at a first portion of the slider and the microphone is located at a second portion of the slider,
wherein the speaker is located at a portion of a fourth side of the body, and the portion of the fourth side is closer to the first portion of the slider than to the second portion of the slider, and
wherein the first side and the fourth side of the body face different directions, and the second side of the slider and the fourth side of the body face different directions such that the display unit and the speaker face different directions.

2. The mobile terminal of claim 1, wherein:
the transverse sliding unit further comprises an elastic unit including an elastic protrusion unit related to a plurality of grooves and configured to control a sliding movement of the slider with respect to the body when a force is applied to the slider; and
the slider is configured to slide when the force is stronger than an elastic force provided by the elastic unit.

3. The mobile terminal of claim 1, wherein the slider has the same length as the body.

4. The mobile terminal of claim 1, wherein the slider has the same width as the body.

5. The mobile terminal of claim 1, wherein the slider has the same width and length as the body.

6. The mobile terminal of claim 1, wherein the rail body is longer than the rail guide.

7. The mobile terminal of claim 1, wherein the first side of the body and the second side of the slider have the same size and shape.

8. The mobile terminal of claim 1, wherein:
the rail body further has a base portion constructed with a rectangular shape and a predetermined thickness; and
the rail groove is formed longitudinally on a surface of the base portion.

9. The mobile terminal of claim 1, wherein the rail guide comprises stopping portions extending from both sides of the rail portion.

10. The mobile terminal of claim 1, wherein the rail body protrudes from the third side of the slider and the rail guide protrudes from the first side of the body.

11. The mobile terminal of claim 1, wherein the keys of the keypad are arranged along the length of the body in a lengthwise direction.

12. The mobile terminal of claim 1, wherein the keypad has a QWERTY key layout.

13. The mobile terminal of claim 1, wherein the at least one key comprises keys having numeric characters for receiving a telephone number.

14. The mobile terminal of claim 13, wherein the telephone number is received in the closed configuration.

15. The mobile terminal of claim 14, wherein a call is executed in the closed configuration after receiving the telephone number via the keys having the numeric characters.

16. The mobile terminal of claim 1, further comprising a plurality of buffering members each having a low friction strip, the plurality of buffering members coupled to the slider or the body and configured to reduce friction when the slider is moved with respect to the body,
wherein the low friction strip is constructed from a synthetic material that reduces friction between the body and the slider when the slider is moved such that the mobile terminal is converted into the open or closed configuration.

17. The mobile terminal of claim 1, wherein the rail body is fixedly coupled to the third side of the slider by a fastener.

18. The mobile terminal of claim 17, wherein the fastener comprises a screw.

19. The mobile terminal of claim 1, wherein the keypad is covered by the slider when the slider is moved such that the mobile terminal is converted into the closed configuration and the keypad is exposed when the slider is moved such that the mobile terminal is converted into the open configuration.

20. The mobile terminal of claim 19, wherein the rail body is partially exposed when the slider is moved such that the mobile terminal is converted into the open configuration.

21. The mobile terminal of claim 19, wherein voice based communication is performed in the closed configuration and text based communication is performed in the open configuration.

22. The mobile terminal of claim 1, wherein the mounting region is approximately one half of the first side of the body.

23. The mobile terminal of claim 22, wherein the mounting region and the rail guide are covered by the slider in both the closed and open configurations.

24. The mobile terminal of claim 22, wherein the rail guide is fixedly coupled to the mounting region of the body by a fastener.

25. The mobile terminal of claim 24, wherein the fastener comprises a screw.

26. The mobile terminal of claim 1, further comprising:
a processor coupled to the slider and configured to detect whether the mobile terminal is in the closed configuration or the open configuration.

27. The mobile terminal of claim 26, wherein the image information is rotated 90 degrees from a transverse orientation to a longitudinal orientation when the processor detects that the mobile terminal has been converted from the closed configuration to the open configuration.

28. The mobile terminal of claim 26, wherein the image information is rotated 90 degrees from a longitudinal orientation to a transverse orientation when the processor detects that the mobile terminal has been converted from the open configuration to the closed configuration.

29. The mobile terminal of claim 1, wherein the transverse groove portion comprises a first transverse groove portion constructed at a first side of the longitudinal groove portion and a second transverse groove portion constructed at a second side of the longitudinal groove portion.

30. The mobile terminal of claim 1, wherein the mounting region and the key arrangement region are divided lengthwise on the first side of the body such that the key arrangement region is arranged along substantially the entire length of the body.

31. The mobile terminal of claim 1, wherein the keys are arranged at the key arrangement region along substantially the entire length of the body.

32. The mobile terminal of claim 2, wherein the plurality of grooves are formed at prescribed intervals along a sliding direction of the slider and the elastic protrusion unit is configured to be coupled with the plurality of grooves in sequence.

33. The mobile terminal of claim 32, wherein the elastic protrusion unit is further configured to be separated from each of the plurality of grooves by its elasticity.

* * * * *